US009996170B2

(12) United States Patent
Piccionelli

(10) Patent No.: US 9,996,170 B2
(45) Date of Patent: Jun. 12, 2018

(54) FINGER COMPUTER DISPLAY AND CONTROLLER DEVICE

(71) Applicant: Gregory A. Piccionelli, Westlake Village, CA (US)

(72) Inventor: Gregory A. Piccionelli, Westlake Village, CA (US)

( * ) Notice: Subject to any disclaimer, the term of this patent is extended or adjusted under 35 U.S.C. 154(b) by 0 days. days.

(21) Appl. No.: 15/230,133

(22) Filed: Aug. 5, 2016

(65) Prior Publication Data

US 2017/0060267 A1 Mar. 2, 2017

Related U.S. Application Data

(63) Continuation-in-part of application No. 13/815,824, filed on Mar. 15, 2013, and a continuation-in-part of application No. 13/815,763, filed on Mar. 15, 2013, now Pat. No. 9,553,963.

(60) Provisional application No. 62/201,393, filed on Aug. 5, 2015, provisional application No. 62/201,486, filed on Aug. 5, 2015.

(51) Int. Cl.
| | |
|---|---|
| *G06F 3/0346* | (2013.01) |
| *G06F 3/01* | (2006.01) |
| *G06F 3/14* | (2006.01) |
| *G07F 17/32* | (2006.01) |
| *G10H 1/00* | (2006.01) |
| *H04R 27/00* | (2006.01) |

(52) U.S. Cl.
CPC ............ *G06F 3/0346* (2013.01); *G06F 3/014* (2013.01); *G06F 3/1423* (2013.01); *G07F 17/3272* (2013.01); *G10H 1/0008* (2013.01); *G10H 2220/326* (2013.01); *G10H 2240/211* (2013.01); *H04R 27/00* (2013.01); *H04R 2227/003* (2013.01); *H04R 2420/07* (2013.01)

(58) Field of Classification Search
None
See application file for complete search history.

(56) References Cited

U.S. PATENT DOCUMENTS

| | | | | |
|---|---|---|---|---|
| 2008/0136775 A1* | 6/2008 | Conant | ................... | G06F 3/014 345/156 |
| 2015/0027297 A1* | 1/2015 | Avitabile | ............. | G09B 15/003 84/470 R |
| 2015/0088546 A1* | 3/2015 | Balram | ................. | G06F 19/322 705/3 |
| 2015/0189971 A1* | 7/2015 | Hakeem | ............... | A45D 44/005 132/200 |

FOREIGN PATENT DOCUMENTS

JP 2008-168062 * 7/2008

* cited by examiner

*Primary Examiner* — Nicholas J Lee
*Assistant Examiner* — Duane N Taylor, Jr.
(74) *Attorney, Agent, or Firm* — Gregory B. Gulliuer

(57) ABSTRACT

A processor connected to one or more displays shaped to affix to a finger nail for displaying an image.

17 Claims, 6 Drawing Sheets

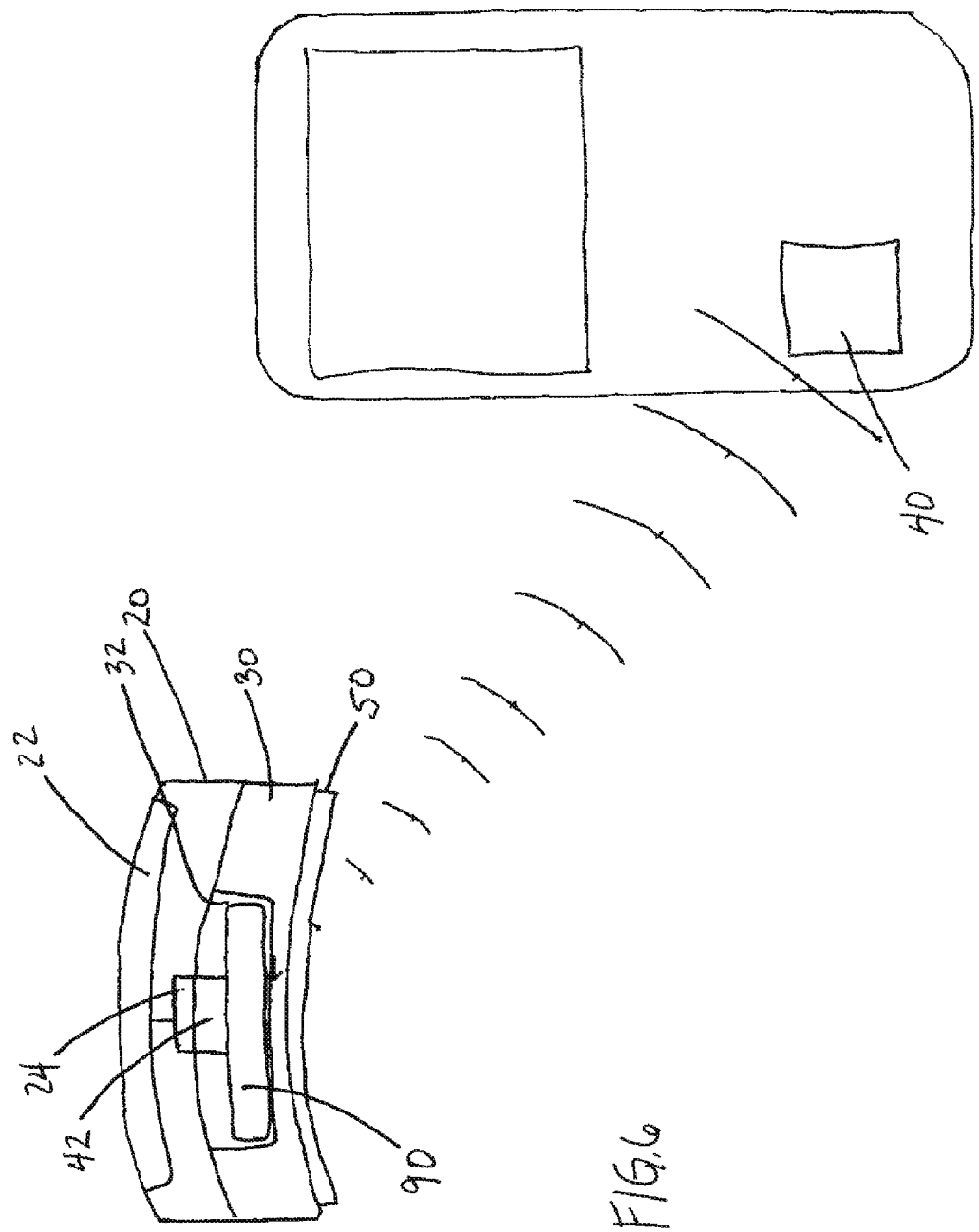

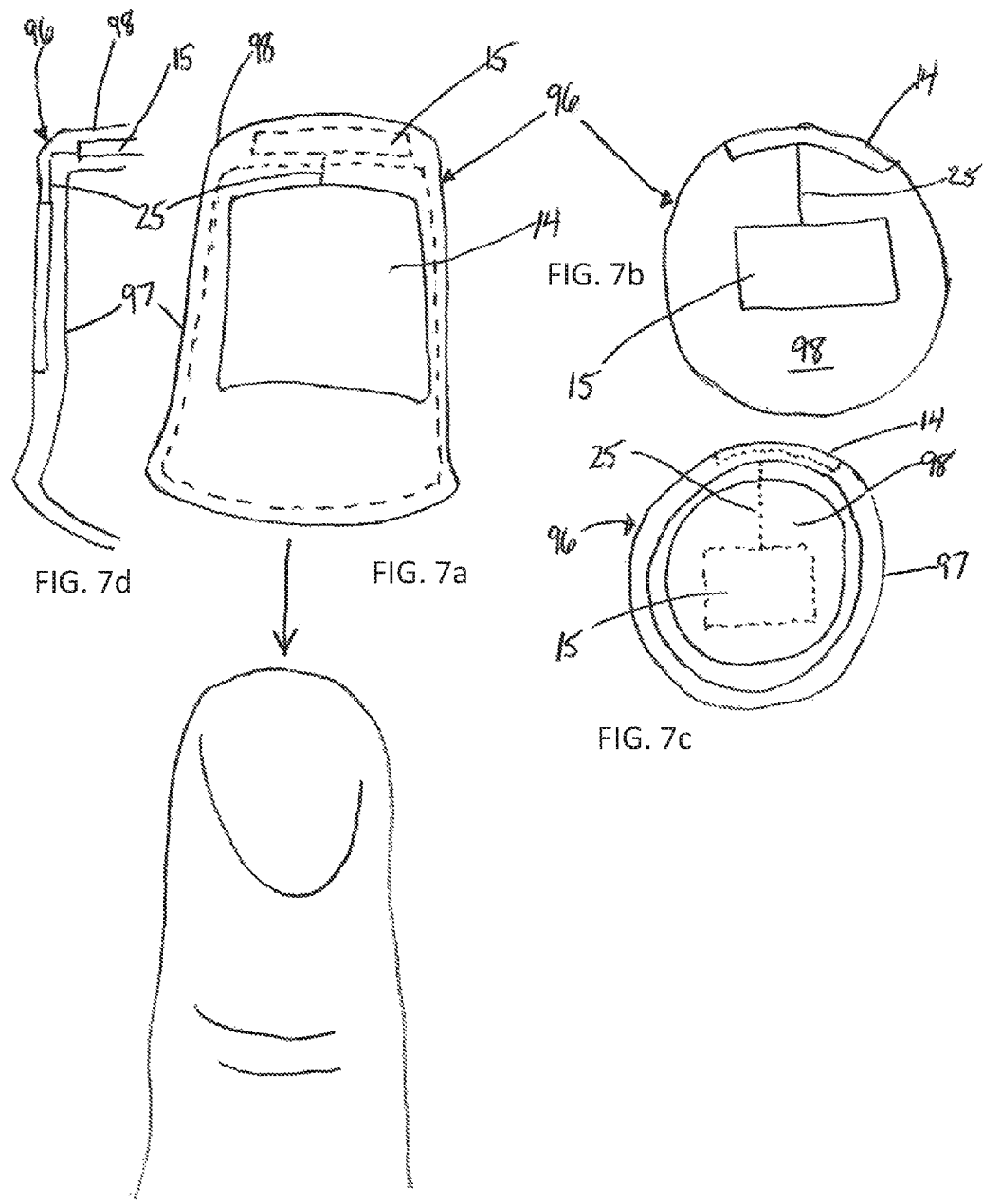

FINGER COMPUTER DISPLAY AND CONTROLLER DEVICE

RELATED APPLICATION

This application claims priority to U.S. Provisional Application Ser. No. 62/201,393, titled "METHODS AND DEVICES FOR CONTROLLING FUNCTIONS EMPLOYING WEARABLE PRESSURE-SENSITIVE DEVIDES," filed on Aug. 5, 2015 and incorporated by reference herein; this application also claims priority to U.S. Provisional Application Ser. No. 62/201,486, titled "FINGER COMPUTER DISPLAY AND CONTROLLER DEVICE," filed on Aug. 5, 2015 and incorporated by reference herein; this application also claims priority to U.S. patent application Ser. No. 13/815,824 (entitled "COMPOSITION PRODUCTION WITH AUDIENCE PARTICIPATION,") filed Mar. 15, 2013; this application also claims priority to U.S. patent application Ser. No. 13/815,763, titled "WRIST PHONE," filed Mar. 15, 2013, that incorporated by reference U.S. Provisional Application Ser. No. 61/849,982, titled "FINGERNAIL SCREEN," filed on Feb. 5, 2013, all of which are incorporated by reference herein.

FIELD OF THE INVENTION

The present invention relates to miniaturized computers, miniaturized telecommunication devices, and miniaturized computer displays, and more specifically, to such devices produced in wearable form.

BACKGROUND OF THE INVENTION

The size of computer and telecommunication device components has continually decreased, making possible ever-smaller computerized devices. Some computerized devices, such as telecommunication devices are now sufficiently small that a user can wear them or incorporate them into articles of clothing.

Originally rigid devices, such as computer display devices have recently been developed that are flexible and thus that can be shaped into a wide variety of desired configurations.

A need exists for a wearable computerized device that incorporates a display screen that can be affixed to a fingernail. A need also exists for a wearable computerized device that incorporates a flexible display that can be affixed to a fingernail.

SUMMARY

In accordance with one embodiment of the disclosure, an approach for a wearable FCDCD located on or in the close proximity of one or more finger (or toe) nail of users. The display by be controlled by a controller that enables different digital content to be displayed on the finger nail. The controller and display my also contain a power supply and be either physically networked to wirelessly networked with other such FCDCD.

The above described features and advantages, as well as others, will become more readily apparent to those of ordinary skill in the art by reference to the following detailed description and accompanying drawings. While it is desirable to provide FCDCD, the teachings disclosed herein also extend to those embodiments which fall within the scope of the appended claims, regardless of whether they accomplish one or more of the above-mentioned advantages.

BRIEF DESCRIPTION OF THE DRAWINGS

The invention may be more readily understood by referring to the accompanying drawings in which:

FIG. 6 illustrates an alternative embodiment in which the processor is disposed remotely from the FCDCD rather than being secured within the artificial nail.

FIGS. 7a-d are illustrations of an alternative embodiment in which the embodiment of FIG. 6 is in a thimble-like finger cap.

Like numerals refer to like parts throughout the several views of the drawings.

DETAILED DESCRIPTION

Figure 1A:
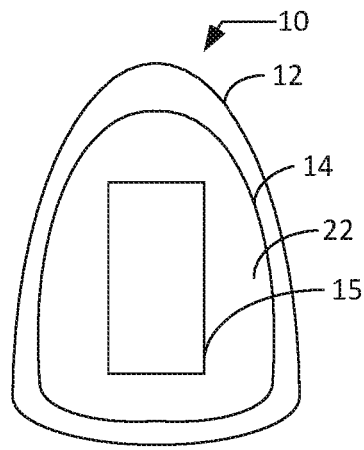
FIG. 1a-c is an exploded perspective view of a first embodiment of a Finger Computer Display and Controller Device ("FCDCD") according to the invention.
Figure 1B:
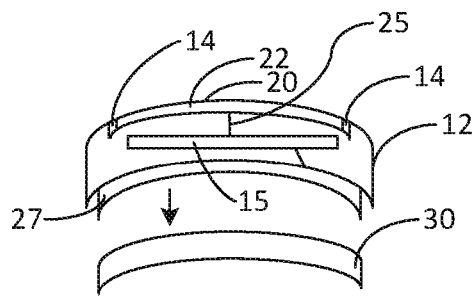
Figure 1C:
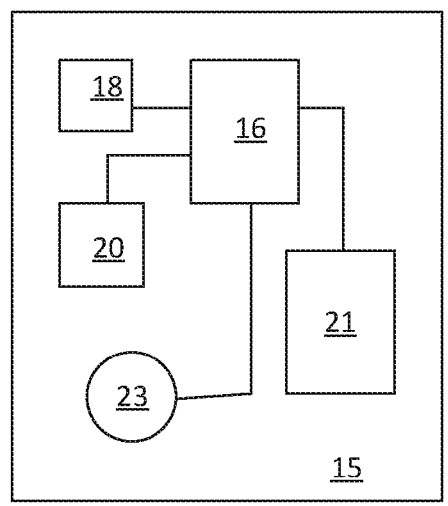
Figure 3:
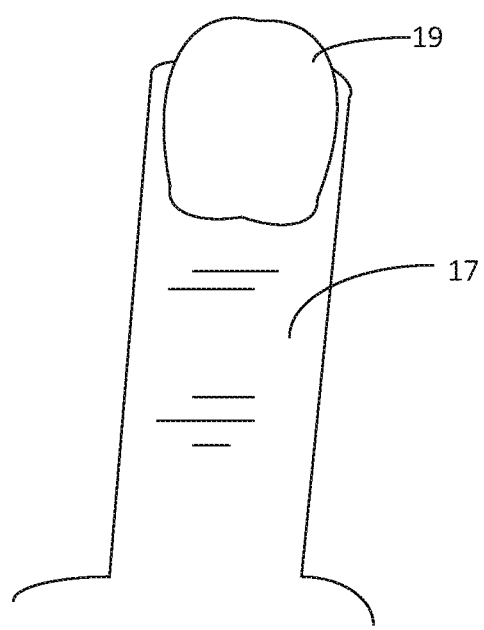
FIG. 3 is an illustration of a finger having a finger nail.

In FIG. 1a-c, exploded perspective view of a first embodiment of a Finger Computer Display and Controller Device ("FCDCD") according to the invention are depicted. The FCDCD 10 includes a case 12 in which is included a screen with an upper layer 20, which in some embodiments is a flexible screen 14 and controller 15. The controller includes a processor 16, a signal receiver 18, a signal transmitter 20, a digital content storage means (memory) 21, and a battery 23. The controller 15 is coupled by a bus 25 to screen 22. Screen upper layer 20 has defined therein display area 22. In some embodiments other components commonly included in a telecommunications device may also be included in the case 12, where the case 12 forming an artificial nail 30 in the current implementation. The artificial nail may be affixed with glue 27 or other "sticky" type substance to a finger nail 19 FIG. 3 on finger 17 of FIG. 3 or toe nail.

Figure 2A:
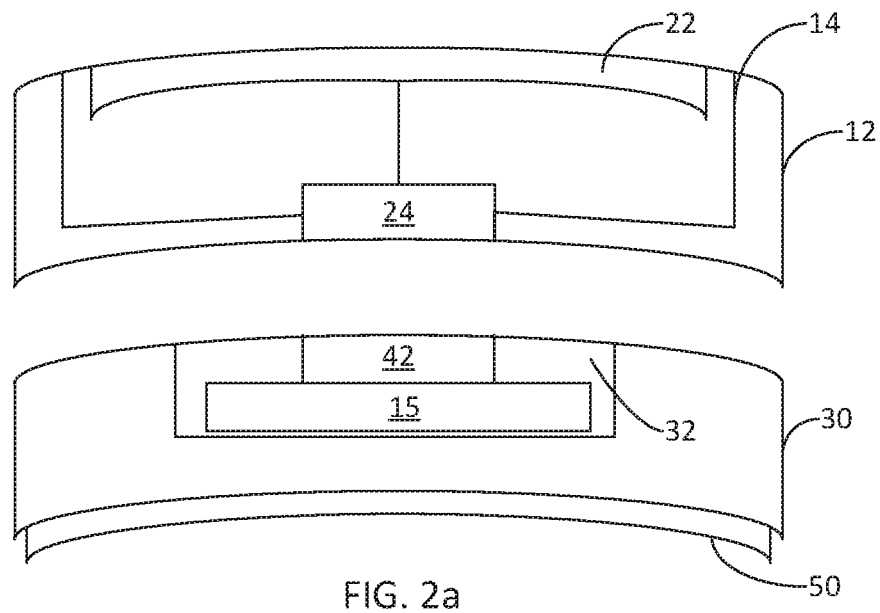
FIGS. 2a-b are cross-sectional and exploded view, respectively, of the embodiment of FIG. 1.
Figure 2B:
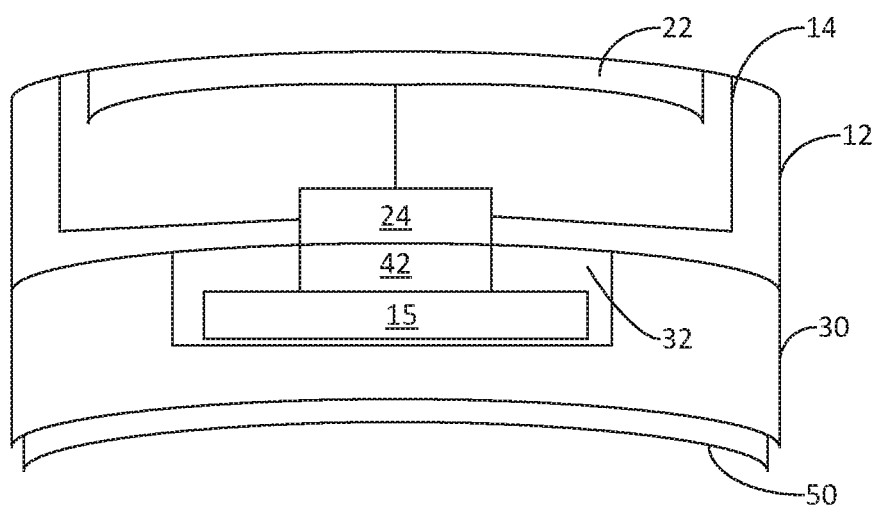

Turning to FIGS. 2a-b, a cross-sectional and exploded views, respectively of the embodiment of FIG. 1 are depicted. The processor contacts 42 of processor 16 in a lower artificial nail portion 30 of artificial nail 10 that has a case processor receptacle 32 having controller 15. The processor contracts 42 communicates with screen contacts 24 of screen 14, enabling processor 16 to control the operation of screen 14 and to produce images in display area 22 of screen upper layer 20. In other implementations, bus 25 may be implemented as contacts 24. FIG. 2a-b also depicted with an adhesive layer 50 that may be glue 27 in the current implementation.

In some implementations the screen is a flexible screen (such as an OLED screen) and in some embodiments the screen or flexible screen is a touch screen. In yet other implementations the case is a flexible case and the components in the case are disposed to operate even with bending of the case reaches a 90-degree angle from center to ends of the case. In yet other implementations, the case may be a substance (such as epoxy) that covers the components to create a protective layer and may also secure the components to the display.

Content that may be stored in, and displayed or played on the FCDCD include, without limitation, visual content, audio content, audiovisual content, text, graphics and/or haptic content.

In some implementations, the case is affixed to an artificial nail. In some implementations the bottom of the case is the artificial nail. Artificial nail 30 can be produced by any of a wide variety of processes known to those skilled in the art, including, without limitation, a variation of methods described in U.S. Pat. No. 7,677,257 and the references cited therein, all of which are incorporated herein by reference. In some implementations, processor 16 is secured within the case processor receptacle 32 defined within the case. In other implementations the processor receptacle 32 is defined within an artificial nail 30. In yet other implementations, artificial nail processor receptacle 32 is defined by removing overlying portions of artificial nail 30 after artificial nail 30 is produced. In other implementations, artificial nail processor receptacle 32 is produced by a molding process used to produce artificial nail 30. In still other specific embodiments, processor 16 is incorporated into artificial nail 30 during the process of producing artificial nail 30, e.g., inserted into a mold into which the material used to form artificial nail 30 is subsequently introduced. In yet other implementations, processor 16 is secured to an upper surface 34 of artificial nail 30, and engages with a screen processor receptacle (not shown) defined within screen upper layer 20. Other methods for incorporating processor 16 between flexible screen upper layer 20 and artificial nail 30 of implementations of finger computer, display and controller devices according to the invention will be obvious to skilled artisans.

In some embodiments, screen upper layer 20 is a flexible screen comprising an OLED screen, such as that produced by SAMSUNG™. Other flexible screens can also be employed. In some embodiments the flexible screen, such as a touch screen capable of transmitting control information to the processor in response to a user's touch and/or tactile interaction with the touch screen. Flexible screen upper layer 20 is formed from the selected flexible screen into a shape generally corresponding to the shape of a nail or an artificial nail 30 or the general with—wise curve of a nail or artificial nail perpendicular to the length of the finger on which the nail or artificial nail is attached, and is secured to upper surface 34 of the nail or artificial nail 30 by one or more appropriate adhesives, mechanical fasteners or other means known to skilled artisans. In some embodiments the flexible screen is a part of a flexible casing which contains the processor, transmitter, receiver, battery and memory components which are disposed within the flexible casing and oriented in relation to each other such that when the case is flexed up to 90-degrees, ends to center, that the components will function properly. In some embodiments other components commonly found in telecommunications devices such as smart phones are similarly oriented in relation to each other such that when the case is flexed up to 90-degrees, ends to center, that the components will function properly.

In some implementations where a flexible screen and a flexible case are used, the case is configured to allow the case to slide. Processor 16 is encoded with appropriate software drivers for controlling the function of screen upper layer 20 to produce images in display area 22 of flexible screen upper layer 20. The images in some implementations may be images of JPEG or other known digital image formats. In yet other implementations, the image may be compressed prior to loading into the FCDCD. In some implementations, processor 16 further comprises transmitter 20 and receiver 18 elements (in other implementations the transmitter and receiver maybe combined into a single transceiver) which enables processor 16 to communicate with an external source, such as a wireless-enabled computer, a smartphone or other telecommunication device, or in specific embodiments, other adjacent finger computer, display and controller devices, in order to receive activation or deactivation instructions, instructions for the production of one or more images in display area 22, coordination instructions between or among adjacent finger computer, display and controller devices, etc. The transmitter 20 and receiver 18 may be implemented to communicate using a known approach, such as wireless, infrared, light sensing/transmitting diodes, three wire bus or other bus structure. In some embodiments activation/deactivation of finger computer display and controller device is accomplished, by means of an included power switch 46. In some embodiments, where the display comprises a touch screen, such activation/deactivation is controlled by a haptic means by user's engagement of virtual switch displayed on the touch screen display.

In specific embodiments, processor 16 is also provided with nano-gyroscope 48, which provides motion and orientation information to processor 16 for use with various applications requiring such information, similarly to "WII®"-type devices.

FCDCD 10 is secured to a user's fingernail 19 by any known means, such as adhesive layer 50.

Figures 4, 5:
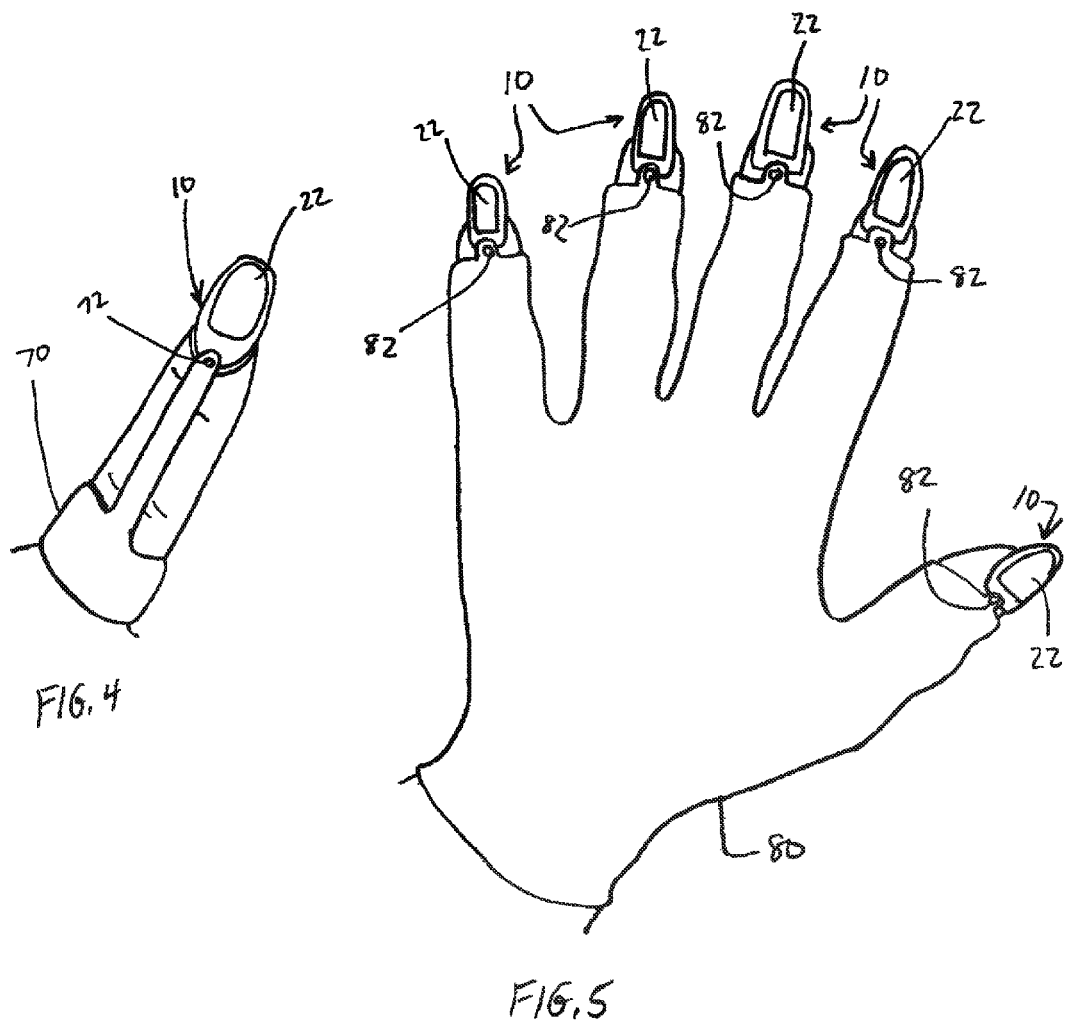
FIGS. 4 and 5 are illustrations of embodiments of finger computer, display and controller devices according to the invention in communication with electricity generating devices that employ a user's body heat.

FCDCD 10 is powered, in certain implementations, by appropriately-sized batteries. In other particular embodiments, FCDCD 10 is powered by RF inductor technology 60, in a manner similar to "smart cards"; such embodiments function best in environments having a continuous supply of appropriate RF signals. In still other embodiments, electricity generated from a thermoelectric material such as Power Felt in contact with a user's body provides sufficient current to operate the FCDCD 10. Depending on the efficiency of the thermoelectric material and the current requirements of FCDCD 10, the power supply for FCDCD 10 can take the form of, for example in FIG. 4, a power band of thermoelectric material 70 positioned around a user's finger and in communication with FCDCD 10 via contact 72 and appropriate conductors and electronic components regulating current flow, or alternatively, a power glove 80 shown in FIG. 5 which provides electricity to a plurality of finger computer, display and controller devices 10 via contacts 82 etc. In some implementations the FCDCD is powered by one or more solar cells disposed on the top of the unit in communication with the battery.

In particular implementations, FCDCD 10 is configured with a touch screen. Such implementations enable a wearer the ability to control by touch, in manners well known to those skilled in the art, various functions of processor 16 or of external processors and/or other devices with which processor 16 are in hard or wireless contact.

Some implementations of the FCDCD have been described above in which processor 16 is incorporated into artificial nail 30. In an alternative implementation shown in FIG. 6 processor 16 is remote from artificial nail 30 and wirelessly communicates with flexible screen upper layer 20 via transmitter/receiver element 90. Processor 16 can be disposed in any desired location, such as, without limitation, a computer, a telecommunication device, a musical instrument, a game controller, a television set, etc. Other communication between processor 16 and flexible upper layer 20, such as a wire or other appropriate circuitry, can also be employed.

Turning to FIGS. 7*a-d*, illustrations of an alternative embodiment in which the alternate embodiment of FIG. 6 is in a thimble-like finger cap 96 are depicted in accordance with an example implementation. In FIG. 7*a*, a thimble-like finger cap 96 top view is depicted forming a case 97 having a screen 14, controller 15, contacts/bus 25. FIG. 7*b* is a front view of thimble-like finger cap 96. FIG. 7c is a back view of thimble-like finger cap 96. FIG. 7d is cut away side view of the thimble-like finger cap 96.

In some implementations individual FCDCDs of a plurality of FCDCDs worn by a use provide discrete or unique identification information regarding the specific FCDCD to an external processor, such as one in or associated with a user's telecommunication device, such as an iPhone or other "smart phone", or a user's computer or similar device. In this way specific content, programming, etc. can be routed by a processor in a hub or other remote processor to a specific FCDCD. In some embodiments, the user's telecommunication device and/or computer can "pair" with the individual FCDCDs (such as with BLUETOOTH™) so that they can be individually controlled or have specified content sent to them by or through an external device such as a user's telecommunication device or computer.

In some implementations the individual FCDCDs communicate with each other to produce coordinated displays.

In some implementations, the FCDCDs can function as switches or other controllers that remotely control external devices by wireless means. For example, in some implementations, such as where the FCDCDs comprise a touch screen and are configured with an application that enables a user to send on/off control signals wirelessly from the FCDCDs to a receiver/control signal relay device in communication with an external device whereby such on/off control signal is provided to the external device to switch such device, or a function associated with such device, on and off. In other implementations, the FCDCDs can control one or more external devices that in turn trigger and/or control one or more sound or signal generating devices, sound or signal modifying devices, synthesizers, light controllers, special effects controllers, or a feature or functionality of a "Collaborative Show Performance System" as that term is used in U.S. patent application Ser. No. 13/815,824, entitled Composition Production With Audience Participation and is incorporated herein by reference.

In some implementations individual FCDCDs provide locational information regarding their location to a heads up display, such as Google Glasses, for controlling a processor in coordination with information displayed on the heads-up display. In this way, for example, if the display of an augmented reality heads up display has a selectable button displayed on it, the user's movement of the finger on which is disposed a FCDCD to a place in the user's visual field displayed via the heads up display where such button is projected, coupled with the engagement of an activation function, such as tapping on the touch screen of the finger computer, display and controller device, will "click" on the button displayed and select and/or engage the function selected by or engaged by the clicking of the button.

In some implementations, such control signal or signals may be provided by one or more FCDCDs using wireless transmissions involving separate and discreet radio frequencies for each of the FCDCDs. In some embodiments, to conserve batter life in the finger computer, display and controller devices, wireless signals from one or more finger computer, display and controller devices are sent to and received by a hub signal relay device that, in turn provides control signal information to one or more external devices. In other implementations the hub includes a receiver, a transmitter, a processor whereby the control signal is received processed and transmitted by the Hub to one or more external receivers in communication with one or more external devices. In some embodiments, the hub is worn by the user.

Content to be displayed on the FCDCD can be provided from any number of sources that can be in wireless communication with the FCDCD, such as from a telecommunications device, a remote server, or any other device or system capable of transmitting visual, audio, audiovisual, graphic, textual, and/or haptic content wirelessly.

In other implementations, the finger computer, display and controller devices are configured to include one or more sound inputting devices, such as microphones and/or one or more sound generating devices. In this way sound content provided to the finger computer, display and controller devices from an external or internal source can be played on the FCDCD. Similarly, sound captured by one or more FCDCDs can be transmitted by the FCDCDs to an external device, such as a telecommunications device, such as the user's smart phone, or another type of computer.

In some implementations, the FCDCDs are configured to include one or more haptic inputting devices. In this way, haptic data provided to an FCDCD, such as from gestures, tactile contact with the device, etc., can be captured and used by the device and/or be transmitted by the device to an external device, such as to a telecommunications device, such as the user's smart phone, or another type of computer, or to an external device to be controlled by such haptic data. In some embodiments, the FCDCD is configured to include one or more haptic outputting devices, such as one or more vibrators, heat generators, etc., in order to output haptic information data sent to the FCDCD.

It will be understood, and is appreciated by persons skilled in the art, that one or more processes, sub-processes, or process steps described in connection with the figures may be performed by hardware and/or software (machine readable instructions) that configures generic hardware to perform a specific function. If the approach is performed by software, the software may reside in software memory (not shown) in a suitable electronic processing component or system such as one or more of the functional components or modules schematically depicted in the figures.

The software in software memory may include an ordered listing of executable instructions for implementing logical functions (that is, "logic" that may be implemented either in digital form such as digital circuitry or source code or in analog form such as analog circuitry or an analog source such an analog electrical, sound or video signal), and may selectively be embodied in any computer-readable medium for use by or in connection with an instruction execution system, apparatus, or device, such as a computer-based system, processor-containing system, or other system that may selectively fetch the instructions from the instruction execution system, apparatus, or device and execute the instructions. In the context of this disclosure, a "computer-readable medium" is any tangible means that may contain or store the program for use by or in connection with the instruction execution system, apparatus, or device. The tangible computer readable medium may selectively be, for example, but is not limited to, an electronic, magnetic, optical, electromagnetic, infrared, or semiconductor system, apparatus or device. More specific examples, but nonetheless a non-exhaustive list, of tangible computer-readable media would include the following: a portable computer diskette (magnetic), a RAM (electronic), a read-only memory "ROM" (electronic), an erasable programmable read-only memory (EPROM or Flash memory) (electronic) and a portable compact disc read-only memory "CDROM" (optical). Note that the computer-readable medium may even be paper (punch cards or punch tape) or another suitable medium upon which the instructions may be electronically captured, then compiled, interpreted or otherwise processed in a suitable manner if necessary, and stored in a computer memory.

The foregoing detailed description of one or more embodiments of the approach for finger computer display and controller device has been presented herein by way of example only and not limitation. It will be recognized that there are advantages to certain individual features and functions described herein that may be obtained without incorporating other features and functions. Moreover, it will be recognized that various alternatives, modifications, variations, or improvements of the above-disclosed embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the embodiments contained herein.

The invention claimed is:

1. A finger computer display and controller device (FCDCD), comprising:
   a power supply;
   a first processor coupled to the power supply;
   a first display responsive to the processor and coupled to the power supply where the display is shaped to affix to a first fingernail and able to display a digital image; and
   a transceiver coupled to the power supply and the processor adapted for receipt of the digital image, where first processor communicates with a second processor that is coupled to a second display affixed to a second fingernail with the transmitter/receiver.

2. The FCDCD of claim 1, where the digital image is a compressed digital image.

3. The FCDCD of claim 1, where the first processor communicates with the first display over a wired interface.

4. The FCDCD of claim 1, where the first processor communicates with the first display wirelessly.

5. The FCDCD of claim 3, where the first processor communicates with a second display wirelessly.

6. The FCDCD of claim 1 where at least the processor and screen are located in a case.

7. The FCDCD of claim 6, where the case is an artificial finger nail.

8. The FCDCD of claim 6, where the case is formed on top of an artificial finger nail.

9. The FCDCD of claim 1, where the transceiver provides movement data from the processor in response to movement of the FCDCD.

10. The FCDCD of claim 9, where the movement data is generated by a micro-gyroscope coupled to the processor.

11. A finger computer display and controller device (FCDCD), comprising:
    a power supply;
    a case shaped like a thimble;
    a first processor coupled to the power supply;
    a first display responsive to the processor and coupled to the power supply where the display is shaped to be in the case and cover a first fingernail and able to display a digital image; and
    a transceiver coupled to the power supply and the processor adapted for receipt of the digital image where first processor communicates with a second processor that is coupled to a second display located on a second fingernail.

12. The FCDCD of claim 11, where the digital image is a compressed digital image.

13. The FCDCD of claim 11, where the first processor communicates with the first display over a wired interface.

14. The FCDCD of claim 11, where the first processor communicates with the first display wirelessly.

15. The FCDCD of claim 14, where the first processor communicates with a second display wirelessly.

16. The FCDCD of claim 11, where the transceiver provides movement data from the processor in response to movement of the FCDCD.

17. The FCDCD of claim 16, where the movement data is generated by a micro-gyroscope coupled to the processor.

* * * * *